United States Patent [19]
Jones et al.

[11] 3,936,261
[45] Feb. 3, 1976

[54] APPARATUS FOR MANUFACTURING BRUSHES

[75] Inventors: Kenneth B. Jones; Walter C. Gorenflo, both of Easthampton, Mass.

[73] Assignee: Vistron Corporation, Cleveland, Ohio

[22] Filed: Sept. 20, 1974

[21] Appl. No.: 507,768

[52] U.S. Cl....... 425/245 R; 425/805; 425/DIG. 51; 425/244; 264/328
[51] Int. Cl.² ........................................... B29F 1/04
[58] Field of Search... 425/245 R, 251, 244, DIG. 51, 425/DIG. 805; 264/328

[56] References Cited
UNITED STATES PATENTS 2,630,601   3/1953   Schiffer et al. .................... 425/805
2,770,011   11/1956  Kelly .............................. 425/245 R Primary Examiner—Robert L. Spicer, Jr.
Attorney, Agent, or Firm—John F. Jones; Sherman J. Kemmer

[57] ABSTRACT

A finished plastic-handled brush is prepared by a single molding step involving gateless molding of the brush back by a tunnel-gating and novel punch-pin finishing apparatus and process which eliminates the usual gate stud, and removing the finished brush back and securing tufts of bristles in the face of the brush back to complete the brush construction.

3 Claims, 11 Drawing Figures

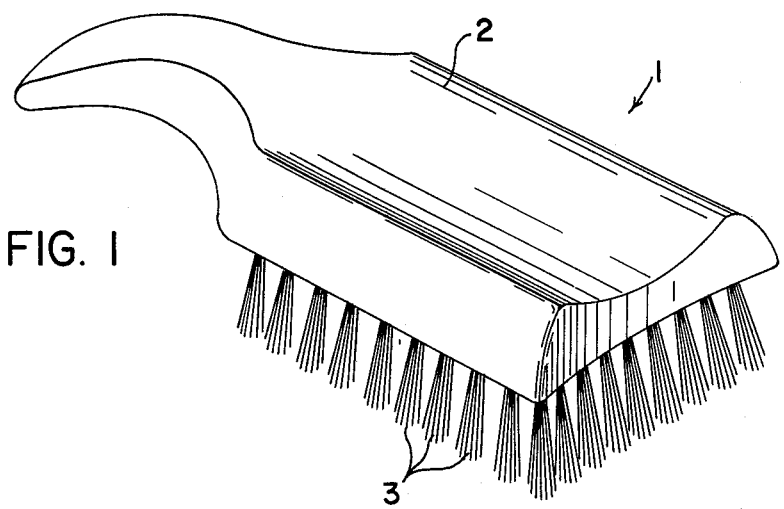
FIG. 1
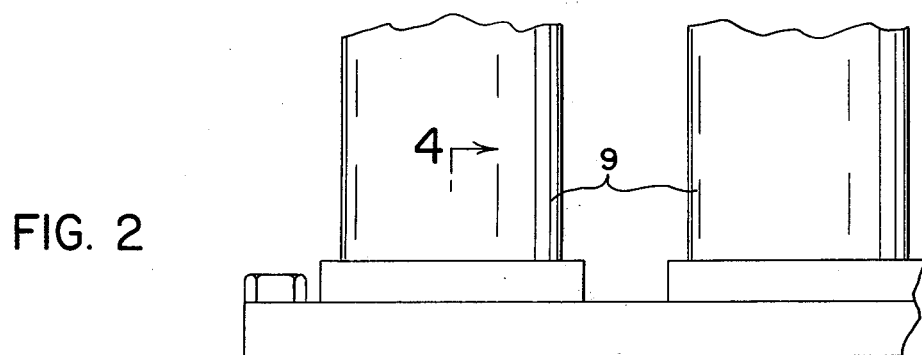
FIG. 2
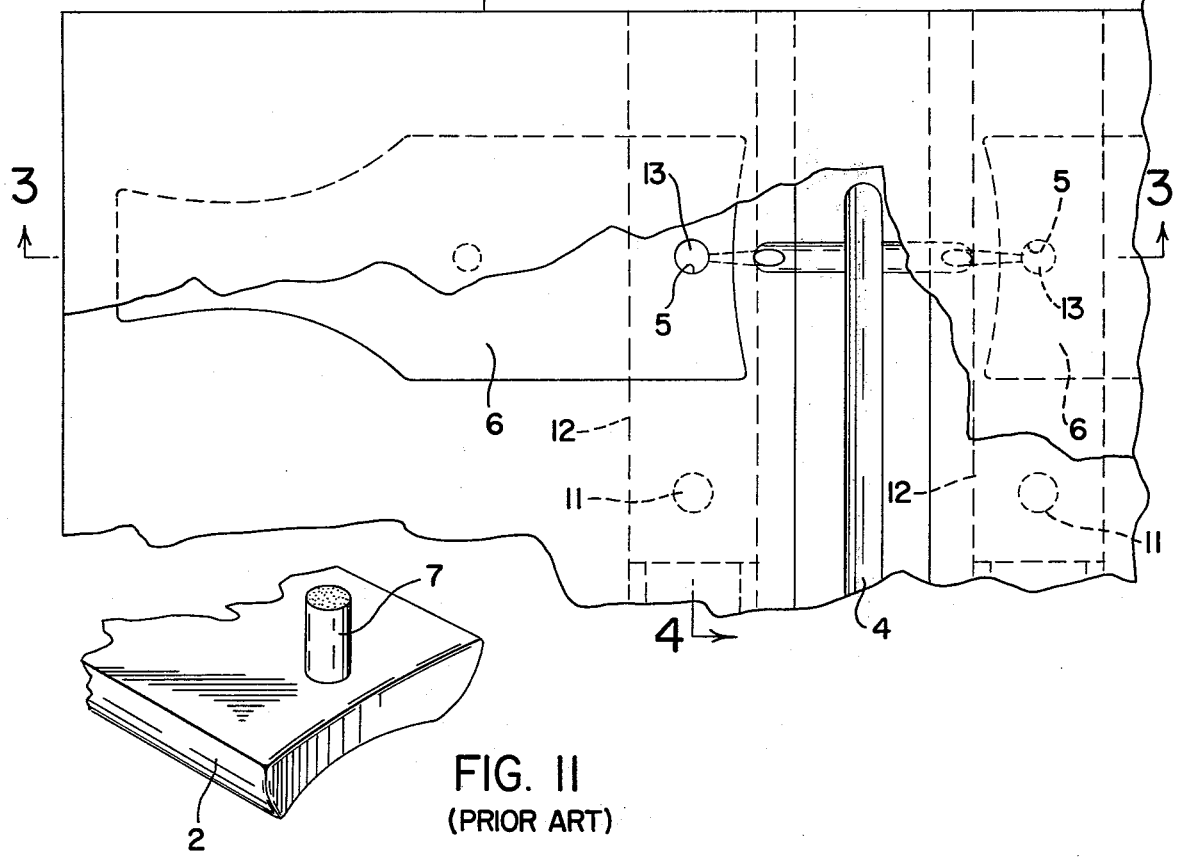
FIG. II
(PRIOR ART)

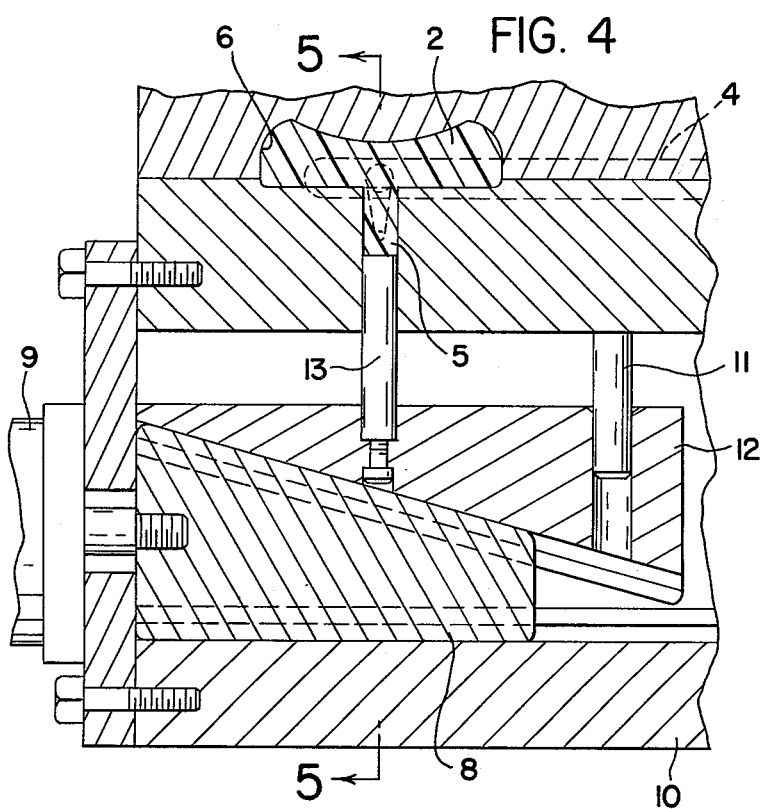
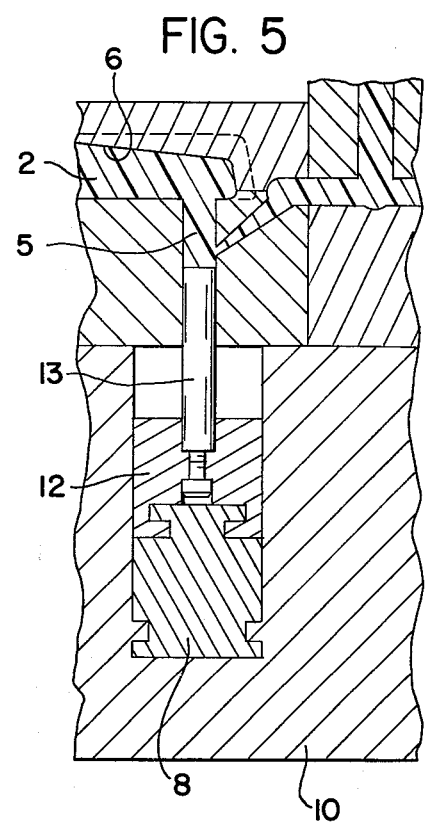
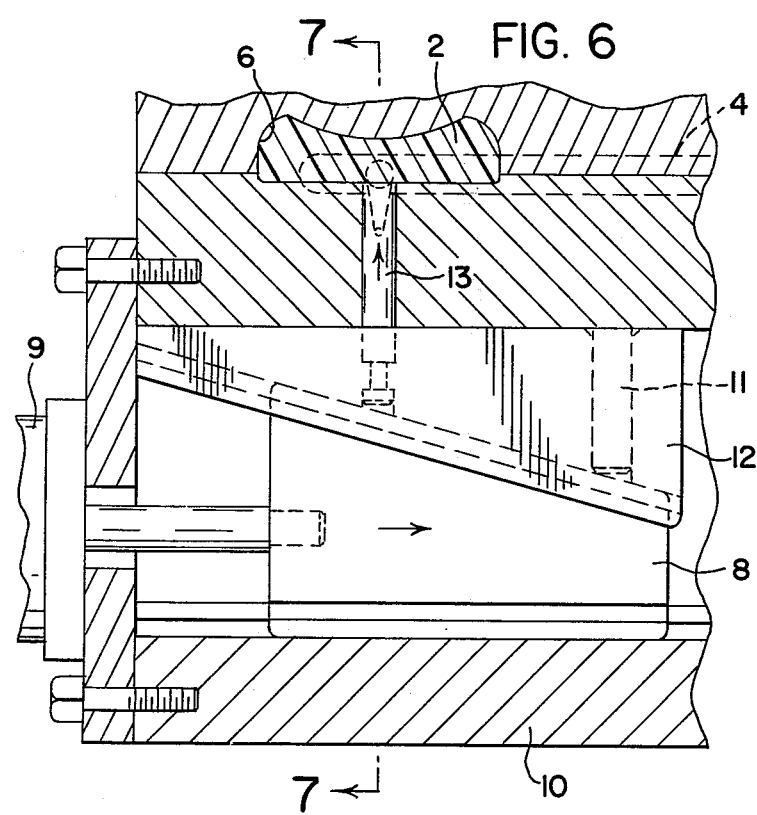
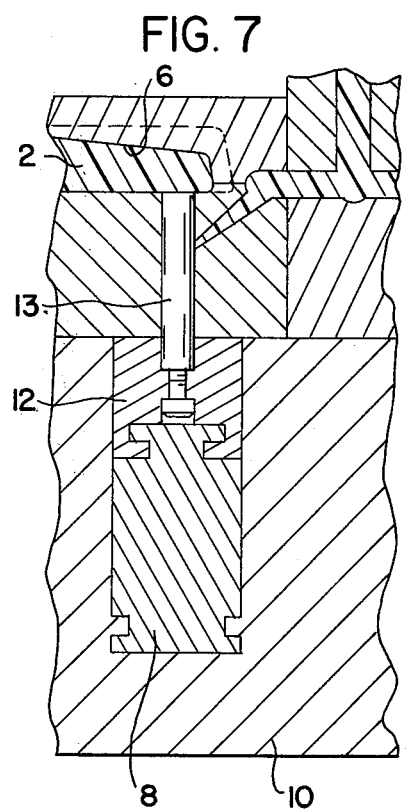

APPARATUS FOR MANUFACTURING BRUSHES

This invention relates to novel brushes and their manufacture, and more particularly pertains to a novel method for manufacturing completely finished plastic brush backs by a single mold step involving gateless molding by tunnel-gating and punch-pin finishing which eliminates the usual gate stud, and to the stapled brushes produced by this novel method. The brushes embodied in this invention include hairbrushes, toothbrushes, clothes brushes, industrial brushes, brooms, and the like.

Brushes of many types and descriptions having plastic bodies or backs are well known and, in the past, have been produced from thermoplastic material by extruding the plastified thermoplastic material into a suitable mold, removing the brush back, removing the flashing and excess plastic material, polishing the rough edges left, and then drilling and stapling the brush back with tufts of bristles. In order to anchor or lock a tuft of bristles in each of the cavities drilled in the brush back, a metallic insert or pin may be forced into the cavity simultaneously with the tuft, as is well known in the art. In the present invention, the brush backs produced are in finished condition ready to be stapled with no flashing and excess plastic material to be removed, polishing, etc., required.

The present invention is further illustrated in the accompanying drawings wherein:

FIG. 1 is a perspective view of a brush of this invention.

FIG. 2 is a top fragmented view of a double mold with brush-back cavities used in the production of the brush of FIG. 1.

FIG. 4 is a view taken along line 4—4 in FIG. 2.

FIG. 5 is a view taken along line 5—5 in FIG. 4.

FIG. 6 is a view like that of FIG. 4 showing parts of the apparatus in different positions.

FIG. 7 is a view taken along line 7—7 in FIG. 6.

FIG. 11 is a bottom perspective view in fragment of a brush back made according to the prior art after it was removed from the mold.

Figure 3:
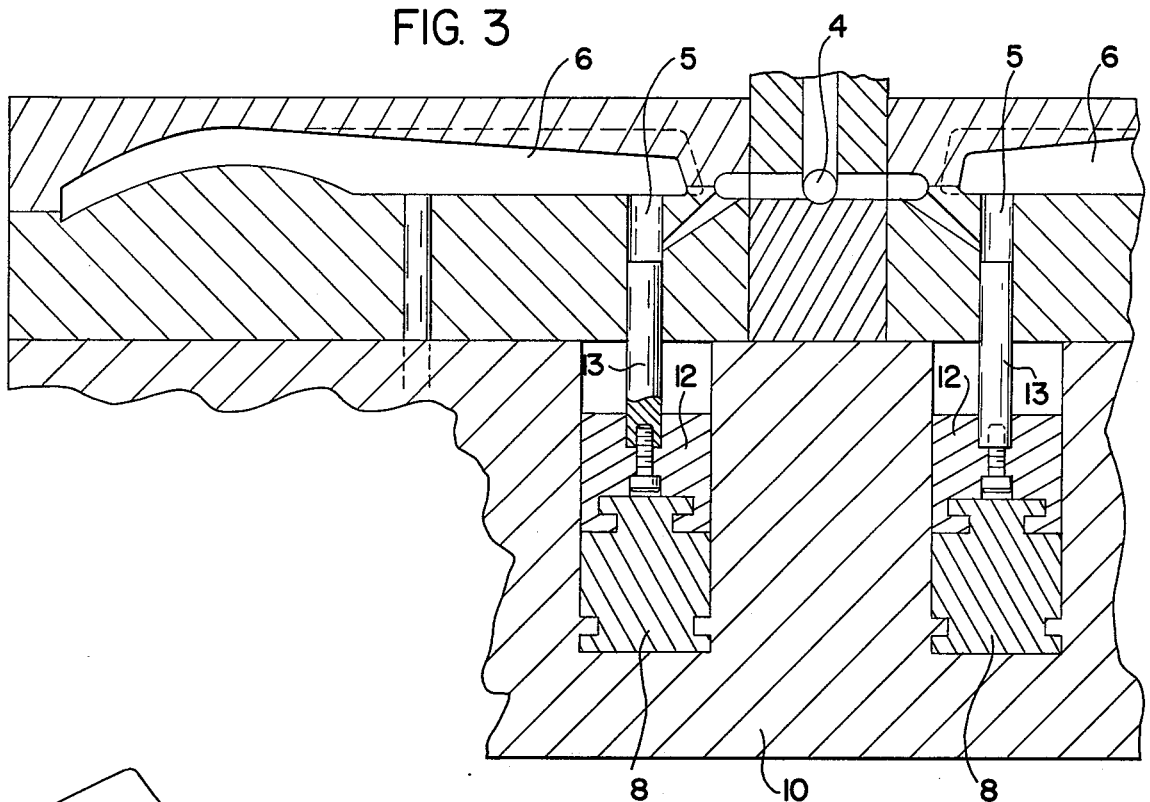
FIG. 3 is a side cross-sectional view of the mold taken along line 3—3 in FIG. 2.

The brush 1 is composed of a plastic back 2 with tufts of bristles 3 secured in the bottom face thereof by drilling and stapling means well known to those skilled in the art. The brush back 2 is prepared preferably by extruding flowable thermoplastic material into a runner section 4 of the mold and through the gate section 5 of the mold into the brush back cavity 6. In the drawings, a cylindrical gate 5 is shown on the face of the brush which produces a cylindrical plug 7 on the face of the brush back when it is prepared by the prior art method and removed from the mold. According to the prior art, it is necessary to rout off the cylindrical plug 7 before the brush is ready to be stapled. This routing or plug-removal step is avoided by the present invention. According to the present invention, there is provided an attachment to the mold a cam slide 8 which is slidably connected to and moved forward or backward by a cylinder 9 which may be operated by hydraulic pressure. The cam slide moves horizontally forward or backward between a lower-plate retainer 10 and a punch-pin carrier bar 12 which is provided with openings to receive a guide pin 11 for the carrier bar 12 and a punch pin 13 which is moved up and down in accordance with the relative movement of the cam slide and within the gate section 5.

Figure 8:
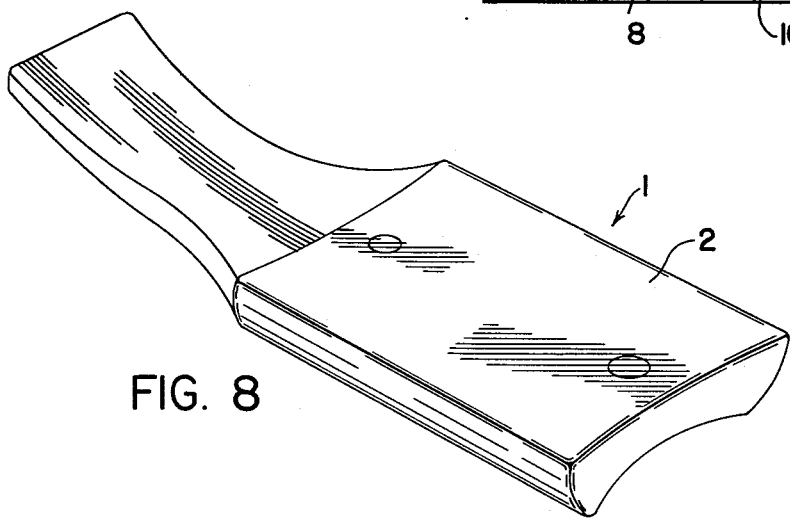
FIG. 8 is a perspective view of the bottom of the finished brush back made according to this invention.
Figure 9:
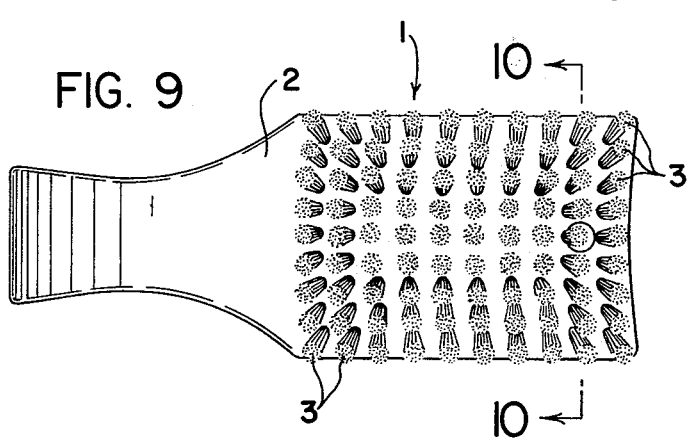
FIG. 9 is a bottom perspective view of the stapled brush according to this invention.
Figure 10:
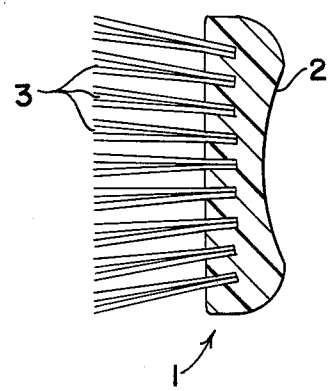
FIG. 10 is a front cross-sectional view of a brush of this invention taken along line 10—10 in FIG. 9.

When the mold cavity 6 is completely filled and while the plastic is still in a semi-fluid state, the hydraulic cylinder 9 advances the cam slide 8 from the position shown in FIGS. 4 and 5 to the position shown in FIGS. 6 and 7, whereby the punch pin 13 moves upwardly pushing the plastic which normally would be the stud 7 completely into the mold cavity 6. The punch-pin carrier bar 12 is retained from moving in a direction parallel to the movement of the cam slide 8 travel by means of a guide pin 11 and is caused by the angle of the cam slide 8 to move in a direction perpendicular to the mold cavity 6 thereby advancing the punch pin 13 and pushing the excess plastic in the gate section 5 into the mold cavity 6. Because the plastic material at this stage is still soft and flowable and the volume of the gate section 5 above the punch pin 13 is small, it becomes a homogeneous part of the final finished molded brush back which is ejected from the mold having the appearance shown in FIG. 8.

When the hydraulic cylinder piston is retracted as shown in FIGS. 4 and 5, the punch-pin carrier bar 12 and punch pin 13 return to their original position, and another shot of plastic material can be run into the mold cavity 6.

This invention eliminates the previously required operation of machining of the gate stud 7 from the brush back 2. This invention thus reduces cost, provides a means for automating the molding operation, and produces a finished brush back from the mold having substantially no visible gate mark or imperfection.

We claim:

1. An apparatus comprising a mold which provides a mold cavity, a cylindrical gate section communicating with said mold cavity, said gate section being equipped with a guide pin and a slidably movable punch pin which is in the form of a solid rod which acts as a piston to force the material present in the gate section into the mold and conforms with the internal shape of the gate section and its end being flush with said mold cavity.

2. The apparatus of claim 1 wherein the punch-pin movement is provided by a cam slide.

3. The apparatus of claim 2 wherein the cam slide is operated by means of a hydraulic cylinder.

* * * * *